United States Patent
Nourai et al.

(10) Patent No.: US 6,660,934 B1
(45) Date of Patent: Dec. 9, 2003

(54) POWER LINE ICE-SHEDDER

(75) Inventors: Ali Nourai, Dublin, OH (US); Raymond M. Hayes, Lancaster, OH (US)

(73) Assignee: AEP EnTech LLC, Columbus, OH (US)

( * ) Notice: Subject to any disclaimer, the term of this patent is extended or adjusted under 35 U.S.C. 154(b) by 112 days.

(21) Appl. No.: 10/044,695

(22) Filed: Jan. 11, 2002

(51) Int. Cl.$^7$ ................................................. H02G 7/16
(52) U.S. Cl. ..................................................... 174/40 R
(58) Field of Search ........................ 174/40 R, 40 TD, 174/42, 45 TD

(56) References Cited

U.S. PATENT DOCUMENTS

| | | | | |
|---|---|---|---|---|
| 5,411,121 A | * | 5/1995 | LaForte et al. | ............ 174/40 R |
| 6,096,971 A | * | 8/2000 | Hull | ......................... 174/40 R |
| 6,207,939 B1 | * | 3/2001 | Allaire et al. | .............. 174/40 R |
| 6,518,497 B1 | * | 2/2003 | Allaire et al. | .............. 174/40 R |

FOREIGN PATENT DOCUMENTS

| | | | | |
|---|---|---|---|---|
| FR | 2672443 A1 | * | 8/1992 | ............ H02G/7/16 |
| JP | 01129709 A | * | 5/1989 | ............ H02G/7/16 |

* cited by examiner

*Primary Examiner*—Dean A. Reichard
*Assistant Examiner*—Adolfo Nino
(74) *Attorney, Agent, or Firm*—Standley & Gilcrest

(57) ABSTRACT

A mechanical ice-shedding device for temporary or permanent attachment to a suspended cable, and particularly to a suspended power line. The ice-shedding device uses a motor to move at least one unbalanced weight, thereby causing a vibration of the device that is translated to the cable to which the device is attached. The vibration causes an oscillation of the cable which is sufficient to substantially shed ice that has accumulated thereon. The output of the motor is preferably regulated so that the cable may be ramped through several frequencies of oscillation, thereby improving its ice-shedding ability. The device may be driven by power from the power line to which it is attached, or from another source, such as a battery or storage capacitor.

67 Claims, 2 Drawing Sheets

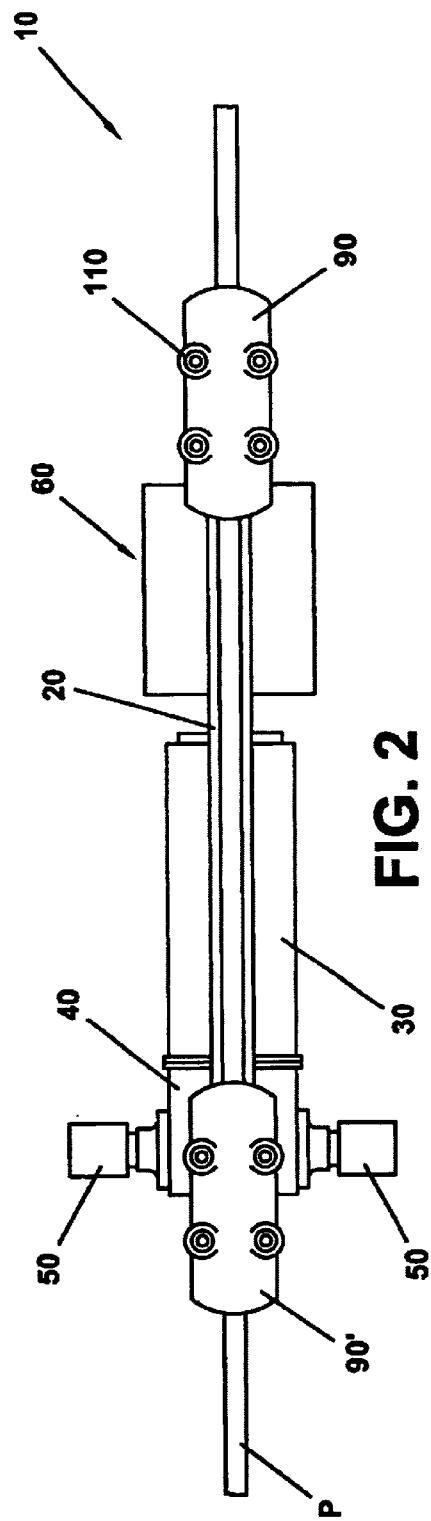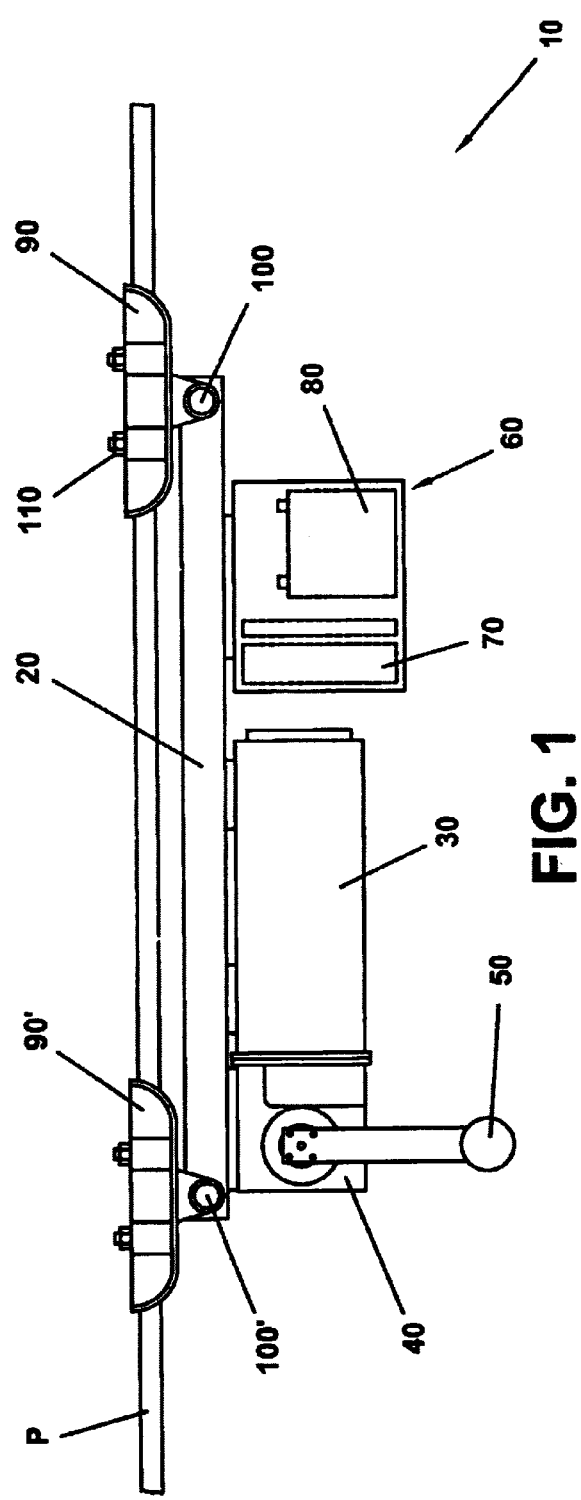

POWER LINE ICE-SHEDDER

BACKGROUND AND SUMMARY OF THE INVENTION

The present invention relates to a device for causing the shedding of ice from suspended cables, and particularly suspended power lines. During winter weather, or in cold climates, storms can occur that may cause an extensive build-up of ice on suspended cables and power lines. Although these storms are somewhat rare, when they do occur the potential for damage, especially to power lines, is great. Like other suspended cables, suspended power lines must support their own weight, which causes a strain on both the material of the power lines, as well as the devices used to secure the power lines to poles, towers, or other support structures. The build-up of ice on power lines can greatly increase their weight, especially on long spans, thereby also increasing the strain on the power lines and securing devices.

Past ice storms have caused significant damage to power lines in various parts of the country, resulting in disruptions in service and significant repair costs. When ice accumulation becomes sufficient to down power lines, electrical service may be disrupted to large areas, especially if the break occurs in a major, high-voltage power line. Such breaks often require difficult and time consuming repairs, both because inclement weather may make for arduous working conditions, and because high-voltage power lines often traverse remote and rugged terrain that is difficult to reach. Additionally, because such storms may effect a rather large area, an even greater number of more common, low-voltage power lines may potentially suffer damage.

Electric utilities recognize this problem and have attempted a variety of solutions. In fact, it has been determined that there are in excess of thirty different documented techniques that have been explored in regard to the icing problem. One of the most common techniques is likely thermal de-icing; whereby the power lines are heated either by increasing the current passing therethrough, or by passing current through an external jacket of resistive wires or similar material. Unfortunately, thermal de-icing has shown little success and can be an extremely costly process. Passive techniques have also been employed. These techniques may utilize special coatings to help impede the build-up of ice or lessen its ability to bond to the power lines. Passive methods have also proven generally inefficient and unreliable. A limited number of mechanical methods have also been attempted, however, to date, only rolling of the power lines has proven to be practical, albeit not overly effective.

Therefore, what is needed, but has been heretofore unavailable, is an efficient, dependable and cost effective method of preventing or reducing potentially damaging ice accumulation on power lines. The present invention satisfies this need. The present invention contemplates a relatively inexpensive, easy to install, mechanical device that takes advantage of a power line's ability to oscillate at different frequencies when excited into motion.

The ice-shedder of the present invention may be installed on virtually any suspended cable or power line, and may be powered either by the current traveling through a power line on which the ice-shedder is installed, by a local power source, such as battery or storage capacitor, or by both. In general, the ice-shedder uses an electric motor to drive an unbalanced load, thereby producing a vibration of some frequency. When attached thereto, this vibration is transferred to the cable or power line to cause its oscillation. By varying the speed of the motor, the cable or power line may be driven through a series of frequencies that cause a shedding of the ice, or at least a significant portion thereof, that has accumulated on the power line.

The ice-shedder of the present invention may be permanently affixed to a suspended cable or power line, or may be temporarily installed. As may be desirable in permanent installations, in order to determine whether ice build-up has occurred and shedding is required, the ice-shedder can be adapted to monitor certain conditions, such as ambient temperature and the inclination of the cable or power line. If it is determined that shedding is required, the ice-shedder may automatically begin operation. In either permanent or temporary installations, the ice-shedder may be further adapted for operation by remote control or other remote starting means.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein:

FIG. 1 is a lateral view of an embodiment of an ice-shedder of the present invention, shown here attached to a section of power line;

FIG. 2 is a top view of the ice-shedder of FIG. 1; and

DETAILED DESCRIPTION OF THE EXEMPLARY EMBODIMENT(S)

Figure 3:
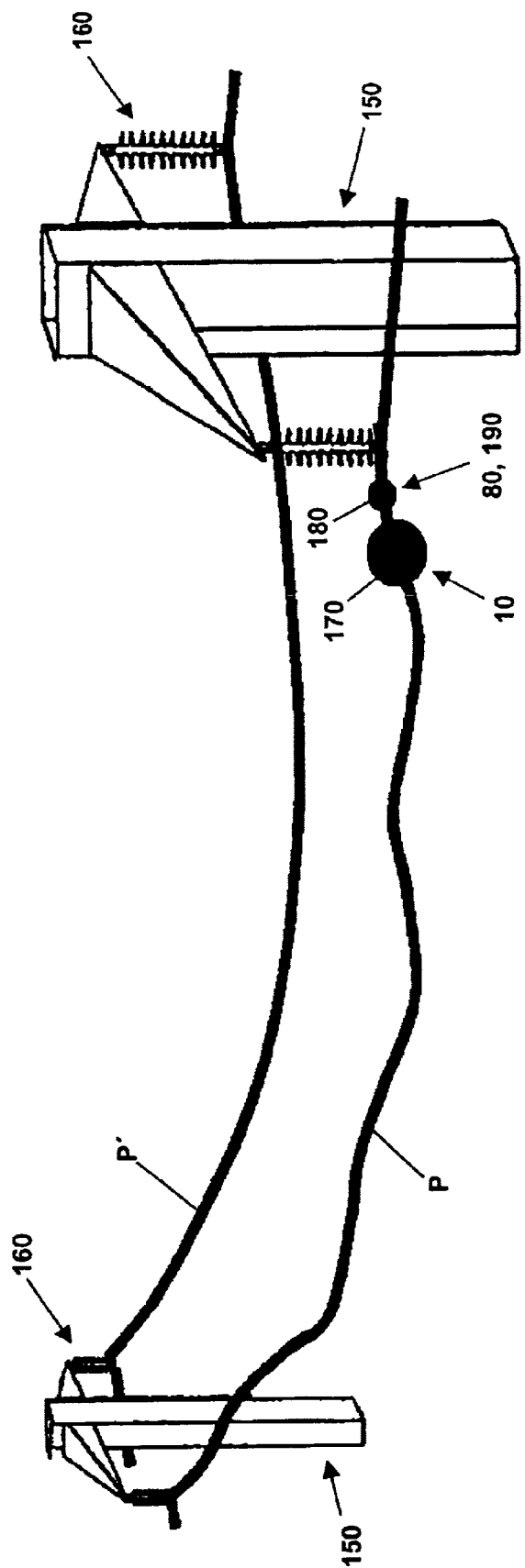
FIG. 3 illustrates an exemplary installation of the ice-shedder of the present invention on a power line suspended between multiple support towers.

The present invention recites an ice-shedder for causing the removal of ice which has accumulated on suspended cables, and more particularly, on suspended power lines. The ice-shedder of the present invention is a mechanical device that can produce oscillations of a suspended cable or power line to which it is attached, thereby causing accumulated ice to be shed therefrom. Although it is readily apparent from the drawing figures and accompanying description that the ice-shedder of the present invention may be used to de-ice virtually any type of suspended cable, for purposes of clarity, the ice-shedder will be described below only as applied to a suspended power line.

A lateral view of an embodiment of the ice-shedder of the present invention can be seen in FIG. 1. The ice-shedder 10 preferably has a central support 20 for receiving other components of the ice-shedder. A motor 30 is attached to the central support 20 and is preferably further connected to a drive mechanism, such as the gearbox 40 shown, which itself is preferably mounted to the central support. Although a gearbox 40 is shown as the drive mechanism in this particular embodiment of the present invention, other devices, such as, for example, a slider-crank device, may also be coupled to the motor 30 and employed as the drive mechanism. The gearbox 40 permits the motor 30 to be coupled to one or more unbalanced weights (as described in more detail below) for effecting the ice-shedding operation. In the particular embodiment of the ice-shedder 10 shown in FIG. 1, the gearbox 40 provides two output shafts for coupling the gearbox to the unbalanced weight, thereby permitting the single output shaft of the motor 30 to drive two separate loads. The gearbox 40 also preferably allows the rotational speed of the motor 30 to be reduced to a more desirable level. In this case, the gearbox 40 may have a fixed gear reduction ratio or, alternatively, may have a variable transmission for allowing the unbalanced weights to be moved at different speeds even if the rotational speed of the motor 30 is constant. The motor 30 is preferably an electric motor, although other types of motors may also be used in conjunction with the gearbox 40 described above to obtain the desired speed of the unbalanced weights. It may be possible, for example, to utilize a gas or other fuel powered motor (not shown) during temporary installations of the ice-shedder 10. It may also be possible to employ an electric gear motor to drive the unbalanced weight, wherein the gearbox 40 may be unnecessary.

The motor 30 and gearbox 40 serve to drive one or more unbalanced weights 50, 50', which in this particular embodiment results from the offset state thereof. Displacement of the unbalanced weights 50, 50' by the motor 30 and gearbox 40 generates a vibration of some frequency. While the amount of weight coupled to the output shafts of the gearbox 40 may vary depending on the diameter of the power line, its span, and other factors, good results have been achieved using a total of 40 pounds of unbalanced weight.

Although motor 30 speed may be controlled by varying current, or by other similar means, a microprocessor based controller 70 is preferably employed to control the output of the motor. The microprocessor based controller 70 is preferably located within an enclosure 60 to protect it from the elements. By utilizing a microprocessor based controller 70 to control the motor 30 output, vibrations of varying frequency may be generated by the ice-shedder 10. More importantly, the microprocessor based controller 70 allows the ice-shedder 10 to be ramped through a number of frequencies during operation. As discussed in more detail below, it has been found that by ramping a power line through several resonant frequencies, ice accumulations may be dislodged more effectively.

At least in permanent installations, it is preferable that the ice-shedder 10 draw power (not shown) from the power line to which it is attached. However, a local power source 80 may also be used with the ice-shedder 10. A local power source 80 may be necessary in temporary installations, or in situations wherein the ice-shedder 10 is attached to a de-energized or low current-carrying line. In such installations, the local power source 80 may be housed within the enclosure 60 and may act as the sole power source for the ice-shedder 10. In permanent installations, the local power source 80 may also be located in the enclosure 60, but is more preferably located in an enclosure separate from the ice-shedder 10 (see FIG. 3). In a permanent installation, the local power source 80 may serve to assist in the start-up of the motor 30, or alternatively, may act as the sole power source for the motor if line current is lost.

In one embodiment of the present invention, the local power source may be a battery, preferably of the rechargeable variety. In another embodiment of the present invention, the local power source 80 is comprised of one or more rechargeable storage capacitors. Preferably, a high-energy density storage capacitor, such as an electrochemical capacitor is utilized in such an embodiment. Whether a battery or capacitor is employed, recharging may be accomplished by a variety of means, including: the periodic removal of the battery or capacitor from the housing for remote recharging; by a local solar powered charging system; or, by drawing power from the power line. Necessary power converting and/or inverting electronics (not shown) may be provided along with the local power source 80 as needed. Unlike batteries, capacitors are not as detrimentally affected by cold temperatures. Thus, because the ice-shedder 10 will be subjected to cold temperatures, typically for extended periods of time, a capacitor provides for a more reliable energy source. While a variety of capacitor types may be used as the local power source 80, it is preferable to utilize one or an array of electrochemical capacitors. Such a capacitor design has been generally, previously described in U.S. Pat. No. 6,222,723. This design allows for a storage device of high energy storage density in a limited space. Such an electrochemical capacitor may be, for example, of nickel-KOH-carbon or lead-sulfuric acid-carbon construction. In temporary installations, the ice-shedder 10 may be further adapted for operation by remote control or other remote starting means, such as, for example, by radio control. It is also preferred that in permanent installations, a remote manual over-ride be provided for the manual starting or stopping of the device 10.

The central support 20 and the above-mentioned components attached thereto are preferably detachably affixed to a power line P by means of line clamps 90, 90' or similar devices. The line clamps 90, 90' are preferably connected to the central support 20 via pivots 100, 100' located near each end thereof. The pivots 100, 100' generally allow the ice-shedder 10 to remain more stable during oscillations of the power line P than if a rigid connection is employed. The design of this particular embodiment of the line clamps 90, 90' may be more readily observed by reference to FIG. 2. The line clamps 90, 90' generally comprise an outer portion which partially surrounds the power line P, and may have an inner portion (not shown) that serves to trap the power line therebetween when the outer and inner portions are fastened together. The outer and inner portions may be fastened together by bolts and nuts 110 or other similar means. Alternatively, the outer portion of the line clamps 90, 90' may be fastened to the power line P by U-bolts which engage the power line and pass upward through the outer portion. Nuts 110 may be used to affix the U-bolts to the outer portion of the line clamps 90, 90'.

FIG. 3 illustrates a permanent installation of the ice-shedder 10 of the present invention, wherein the ice-shedder is mounted to a first power line P of a dual power line system. The power lines P, P' are shown to be attached to support towers 150 by typical support insulators 160. In FIG. 3, the ice-shedder 10 is shown to be contained within a first spherical line marker 170, although other housing shapes are also possible. The first spherical line marker 170 protects the ice-shedder 10 from the elements, and preferably has a metallic liner to provide electric field shielding. A line-fed power supply 190 and local power source 80 are preferably located in a second spherical line marker 180 attached to the power line P, and in proximity to the first spherical line marker 170 and enclosed ice-shedder 10. The line-fed power supply 190 and local power source 80 are connected to the ice-shedder 10 to provide power to the motor 30 and microprocessor based controller 70.

In a permanent installation as depicted in FIG. 3, a monitoring and control device (not shown) is preferably connected to the ice-shedder 10. The monitoring and control device may be located in either the first or second spherical line markers 170, 180. The monitoring portion of the monitoring and control device preferably comprises sensors for monitoring the temperature of both the power line P and the ambient air, the amount of electric current flowing through the power line, and also the angle of inclination $\beta$ of the power line in its natural state. A sufficiently low temperature and a sufficient increase in the angle of inclination β of the power line P may indicate ice accumulation. Preferably, the monitoring portion of the monitoring and control device is also adapted to consider the amount of electric current flowing through the power line P in determining whether ice accumulation exists, as current flow can also affect the angle of inclination β. If the monitoring portion of the monitoring and control device indeed determines that the angle of inclination β indicates ice has accumulated on the power line P, the control portion of the monitoring and control device is preferably adapted to automatically start the ice-shedder 10. The control portion of the monitoring and control device may halt operation of the ice-shedder 10 after a pre-determined period of time has elapsed, upon the power line P reaching a pre-determined frequency, or upon the occurrence of a number of other conditions.

During the operation of this particular embodiment, displacement of the unbalanced weights 50, 50' by the motor 30 and gear box 40 will cause a vibration of the ice-shedder 10 at some frequency, thereby generating an oscillation of the power line P. The frequency of the vibrations may be increased by increasing the speed of the motor 30. The effect of the ice-shedder 10 can be readily observed in FIG. 3 by comparing the oscillating form of the first power line P with the natural suspended state of the second power line P'.

Through experimentation with the ice-shedder 10 mounted on several types of typical power lines, it has been found that as the resonant frequency of the power line is increased, the displacement of the power line will generally decrease, while the acceleration of the power line will generally increase. As it has been determined that higher power line P accelerations generally cause more successful ice shedding, and higher resonant frequencies of the power line produce higher power line accelerations; higher resonant frequencies are preferably employed to shed accumulated ice, with a ramping of the frequencies being even more preferable. To this end, accelerometers or similar sensors may be attached to the power line P and connected to the microprocessor based controller 70 to monitor power line acceleration and further refine the control of the ice-shedder 10.

Tests were conducted on power lines of up to approximately 1.2 inches in diameter and on spans of up to about 500 feet. By operating the ice-shedder 10 of the present invention within a frequency range of approximately 1.5–8.0 Hz, power line displacements of between about 4–13 inches were observed, with power line accelerations of between approximately 0.5–14 g. Accumulated ice was adequately shed from the power lines within these ranges, with hanging ice being the most easily shed and tubular type ice being the most difficult to shed. It was also discovered that ramping the excitation frequency of the power lines from approximately 1.5 Hz to approximately 8.0 Hz over a 5 minute period improved results. An examination of the power lines after repeated testing with the ice-shedder 10 revealed no damage to the power lines or support insulators.

While the ice-shedder 10 of the present invention has been described above with particular application to a power line, it should be understood that the ice-shedder is also applicable to virtually any suspended cable that is subject to ice accumulation. As contemplated herein, the specific design of the ice-shedder may vary as long as the desired oscillations may be produced. Additionally, the size of the ice-shedder and the amount of weight used may be altered based upon the suspended cable to which the ice-shedder is to be attached. Similarly, the line clamps 90, 90' disclosed above may be adjusted to fit virtually any diameter of cable, or other means of attachment may be employed. As the ice-shedder of the present invention operates to shed ice by mechanical means and does not rely on properties or characteristics inherent only to power lines, the ice-shedder of the present invention would also be effective in the de-icing of suspended cables used for other purposes and constructed of a multitude of materials.

Therefore, while certain embodiments of the present invention are described in detail above, the scope of the invention is not to be considered limited by such disclosure, and modifications are possible without departing from the spirit of the invention as evidenced by the following claims:

What is claimed is:

1. An ice-shedding device for use on a suspended cable, comprising:
   a central support;
   a motor attached to said central support;
   a power supply for driving said motor;
   at least one unbalanced weight in communication with said motor; and
   an attachment apparatus for affixing said central support to said suspended cable;
   wherein displacement of said unbalanced weight by said motor causes a vibration which is translated to said suspended cable, thereby causing ice accumulated thereon to be substantially shed.

2. The ice-shedding device of claim 1, further comprising a gearbox connecting said motor to said at least one unbalanced weight.

3. The ice-shedding device of claim 1, further comprising a slider-crank mechanism coupled to said motor and said at least one unbalanced weight.

4. The ice-shedding device of claim 1, wherein said at least one unbalanced weight is a flywheel.

5. The ice-shedding device of claim 1, further comprising a microprocessor for controlling the output of said motor.

6. The ice-shedding device of claim 5, further comprising an enclosure for housing said microprocessor.

7. The ice-shedding device of claim 1, wherein said suspended cable is ramped through several frequencies of vibration.

8. The ice-shedding device of claim 1, wherein said power supply is at least one battery.

9. The ice-shedding device of claim 8, wherein said at least one battery can be recharged in situ.

10. The ice-shedding device of claim 1, wherein said power supply is at least one capacitor.

11. The ice-shedding device of claim 10, wherein said at least one capacitor can be recharged in situ.

12. The device of claim 1, wherein said central support is pivotally affixed to said cable.

13. The ice-shedding device of claim 1, wherein said suspended cable is a power line.

14. The ice-shedding device of claim 13, wherein said power supply is current flowing through said power line.

15. The ice-shedding device of claim 14, further comprising at least one battery for supplying power to said ice-shedding device during brief periods where an insufficient operating current or no current is flowing through said power line.

16. The ice-shedding device of claim 15, wherein said at least one battery can be recharged in situ.

17. The ice-shedding device of claim 14, further comprising at least one capacitor for supplying power to said ice-shedding device during brief periods where an insufficient operating current or no current is flowing through said power line.

18. The ice-shedding device of claim 17, wherein said at least one capacitor can be recharged in situ.

19. The ice-shedding device of claim 1, further comprising a monitoring device for determining when a sufficient amount of ice has accumulated on said suspended cable to warrant removal.

20. The ice-shedding device of claim 19, further comprising a control device in communication with said monitoring device, said control device adapted to automatically operate said motor based upon receipt of a signal from said monitoring device.

21. The ice-shedding device of claim 20, further comprising a manual remote control, said manual remote control capable of overriding said automatic operation of said motor.

22. The ice-shedding device of claim 1, wherein said motor may be started and stopped via remote control.

23. The ice-shedding device of claim 1, further comprising an enclosure for housing at least said central support, said motor, said at least one unbalanced weight, and said attachment apparatus, said enclosure applied to said ice-shedding device after attachment of said central support to said suspended cable.

24. The ice-shedding device of claim 23, further comprising electric field shielding means for said enclosure.

25. The ice-shedding device of claim 1, wherein said attachment apparatus provides for releasable attachment.

26. An ice-shedding device for use on a power line, comprising:
   a central support;
   a motor attached to said central support;
   a drive mechanism attached to said central support and in communication with said motor;
   at least one unbalanced weight in communication with said drive mechanism;
   a power supply for driving said motor;
   a microprocessor for controlling the output of said motor; and
   an attachment apparatus for releasably affixing said central support to said power line;
   wherein displacement of said at least one unbalanced weight by said motor and said drive mechanism causes a vibration which is translated by said central support and said attachment apparatus to said power line; and
   whereby said power line is excited into oscillation, thereby causing ice accumulated thereon to be substantially shed.

27. The ice-shedding device of claim 26, wherein said drive mechanism is a gearbox.

28. The ice-shedding device of claim 26, wherein said drive mechanism is a slider-crank device.

29. The ice-shedding device of claim 26, wherein said at least one unbalanced weight is a flywheel.

30. The ice-shedding device of claim 26, further comprising an enclosure for housing said microprocessor.

31. The ice-shedding device of claim 26, wherein said power supply is at least one battery.

32. The ice-shedding device of claim 31, wherein said at least one battery can be recharged in situ.

33. The ice-shedding device of claim 26, wherein said power supply is at least one capacitor.

34. The ice-shedding device of claim 33, wherein said at least one capacitor can be recharged in situ.

35. The ice-shedding device of claim 26, wherein said power supply is current flowing through said power line.

36. The device of claim 26, wherein said central support is pivotally attached to said power line.

37. The ice-shedding device of claim 26, further comprising a monitoring device for determining when a sufficient amount of ice has accumulated on said power line to warrant removal.

38. The ice-shedding device of claim 37, further comprising a control device in communication with said monitoring device, said control device adapted to automatically operate said motor based upon receipt of a signal from said monitoring device.

39. The ice-shedding device of claim 38, further comprising a manual remote control, said manual remote control capable of overriding said automatic operation of said motor.

40. The ice-shedding device of claim 26, wherein said motor may be started and stopped via remote control.

41. The ice-shedding device of claim 26, further comprising an enclosure for housing at least said central support, said motor, said drive mechanism, said at least one unbalanced weight, said microprocessor and said attachment apparatus, said enclosure applied to said ice-shedding device after attachment of said central support to said power line.

42. The ice-shedding device of claim 41, further comprising electric field shielding means for said enclosure.

43. The ice-shedding device of claim 26, wherein said power line is ramped through several frequencies of oscillation.

44. A method of de-icing a suspended cable, said method comprising:
   attaching a mechanical device to said suspended cable; and
   causing said mechanical device to vibrate by moving at least one unbalanced weight;
   whereby said vibration of said mechanical device causes an oscillation of said suspended cable that is capable of substantially shedding ice accumulated thereon.

45. The method of claim 44, wherein said suspended cable is a power line.

46. The method of claim 44, wherein said mechanical device is temporarily attached to said suspended cable.

47. The method of claim 44, wherein said mechanical device is permanently attached to said suspended cable.

48. A method of de-icing a suspended cable, said method comprising:
   providing a central support;
   affixing a motor to said central support;
   connecting a drive mechanism to said motor;
   placing said drive mechanism in communication with at least one unbalanced weight;
   providing a power supply for driving said motor; and
   attaching said central support to said suspended cable;
   whereby the energizing of said motor will cause a corresponding displacement of said at least one unbalanced weight, thereby creating a vibration that generates an oscillation of said suspended cable, said oscillation causing the shedding of at least a substantial amount of ice accumulated on said suspended cable.

49. The method of claim 48, wherein said power supply is at least one battery.

50. The method of claim 49, wherein said at least one battery can be recharged in situ.

51. The method of claim 48, wherein said power supply is at least one capacitor.

52. The method of claim 51, wherein said at least one capacitor can be recharged in situ.

53. The method of claim 48, wherein said suspended cable is a power line.

54. The method of claim 53, wherein said power supply is current flowing through said power line.

55. The method of claim 54, further comprising at least one battery.

56. The method of claim 55, wherein said at least one battery can be recharged in situ.

57. The method of claim 54, further comprising at least one capacitor.

58. The method of claim 57, wherein said at least one capacitor can be recharged in situ.

59. The method of claim 48, further comprising providing a microprocessor to control the output of said motor.

60. The method of claim 48, further comprising providing a monitoring device for determining when a sufficient amount of ice has accumulated on said suspended cable to warrant removal.

61. The method of claim 60, further comprising providing a control device in communication with said monitoring device and adapted to operate said motor in response to receipt of a signal from said monitoring device.

62. The method of claim 61, further comprising providing a manual remote control, said manual remote control capable of overriding said automatic operation of said motor.

63. The method of claim 48, further comprising providing a remote control for starting and stopping said motor.

64. The method of claim 48, wherein said suspended cable is ramped through several frequencies of oscillation.

65. The method of claim 48, further comprising providing an enclosure for housing at least said central support, said motor, said gearbox, said at least one unbalanced weight, and the means employed for attaching said central support to said suspended cable.

66. The method of claim 48, wherein said drive mechanism is a gearbox.

67. The method of claim 48, wherein said drive mechanism is a slider-crank device.

* * * * *